Patented Dec. 7, 1926.

1,610,109

UNITED STATES PATENT OFFICE.

EDWARD LLOYD PEASE, OF DARLINGTON, AND DANIEL TYRER, OF STOCKTON-ON-TEES, ENGLAND.

MANUFACTURE OF FERTILIZERS.

No Drawing. Application filed February 4, 1926, Serial No. 86,052, and in Great Britain February 19, 1925.

This invention relates to the manufacture of a fertilizer containing calcium and phosphorus.

Usually phosphate is supplied to the farmer in the form of superphosphate made by the action of sulphuric acid on calcium phosphate, and ammonia in the form of ammonium sulphate made by absorbing ammonia in sulphuric acid. Considering these products together, two lots of sulphuric acid are required for their production.

It is one object of this invention to economize in this use of sulphuric acid.

According to the invention sulphuric acid is first caused to react with calcium phosphate to form calcium sulphate and phosphoric acid or an acid phosphate, and the calcium sulphate thus produced and still containing any desired proportion of the phosphoric acid or acid phosphate, is then treated with ammonium carbonate, or ammonia and carbon dioxide, to produce ammonium sulphate and calcium carbonate containing phosphate.

In the preferred form of the process the treatment of the calcium phosphate, such as rock phosphate, is conducted so as to produce phosphoric acid which is separated from the calcium sulphate to a controlled extent; generally it suffices to cease the washing operation used in the ordinary process of making phosphoric acid so soon as a reasonably strong acid ceases to be obtained.

The residual calcium sulphate containing some phosphoric acid and generally some calcium phosphate, is then subjected to the action of aqueous ammonia and carbon dioxide or an aqueous solution of ammonium carbonate or treated with a gas containing both $NH_3$ and $CO_2$. The ammonium sulphate thus produced may be separated by filtration from the calcium carbonate, which then remains for use as a fertilizer containing calcium phosphate. The product has the important advantage that whereas the phosphorus in the original phosphate rock was in a highly insoluble form that contained in the product of this process exists in a more readily assimilable form; it is, for example, soluble in citric acid. It also possesses the advantage of being neutral or basic. It may be dried in any desired manner, or it may be mixed with ground peat or other absorbent material.

The phosphoric acid produced may be used for fixing ammonia, separately or after mixture with the ammonium sulphate solution made as described. Thus the total quantity of ammonia fixed by the process may be considerably more than that equivalent to the sulphuric acid used in the process. This can occur as follows:—

The sulphuric acid acting on the calcium phosphate liberates its equivalent of phosphoric acid and also gives rise to its equivalent of calcium sulphate. Calcium sulphate can itself fix ammonia in quantity equivalent to the sulphuric acid from which it is derived, so that the calcium sulphate still containing phosphoric acid remaining after the partial separation of the phosphoric acid can fix a quantity of ammonia more than equivalent to the sulphuric acid used in the process. Moreover, the separated phosphoric acid can also be used to fix ammonia, and, theroretically, if all the phosphoric acid were used for this purpose, the total quantity of ammonia which could be fixed would be just double that equivalent to the sulphuric acid used.

The changes which occur may be expressed as follows:—

(a) $Ca_3(PO_4)_2 + 3H_2SO_4 = 3CaSO_4 + 2H_3PO_4$ (b) $3CaSO_4 + 6NH_3 + 3CO_2 = 3CaCO_3 + 3(NH_4)_2SO_4$ (c) $2H_3PO_4 + 6NH_3 = 2(NH_4)_3PO_4$

Quantity of sulphuric acid used=6 equivalents.

Maximum quantity of ammonia fixed=12 equivalents.

The following example illustrates the invention:—

100 parts by weight of rock phosphate testing 70% $Ca_3(PO_4)_2$, ground to pass a sieve having 100 meshes per square inch are mixed in a mixing machine with 85 parts by weight of sulphuric acid of 1.700 specific gravity, diluted with water or weak phosphoric acid obtained in a previous operation. The mixture is filtered and the calcium sulphate washed on the filter until the washings have specific gravity 1.050. The sulphate is then transferred to a tank in which it is mixed with 3 or 4 parts by weight of water or weak ammonium sulphate solution from a previous operation, to produce a fluid suspension which is then treated with about 28 parts of gaseous $NH_3$, as for example from an ammonia still. Gases containing carbon dioxide are passed through the mixture as long as carbon dioxide is absorbed. The solution of ammonium sulphate is filtered from the calcium carbonate containing phosphate, which is then washed and finely dried. The ammonium sulphate is recovered by crystallization.

Having thus fully described the nature of the said invention and the best means we know of carrying the same into practical effect, we claim:—

1. A process of making fertilizers which consists in causing sulphuric acid to react with calcium phosphate to form calcium sulphate and phosphoric acid and then treating the calcium sulphate, while it still contains phosphoric acid, with ammonium carbonate so as to produce ammonium sulphate and calcium carbonate containing phosphate.

2. A process of making fertilizers which consists in causing sulphuric acid to react with calcium phosphate to form calcium sulphate and phosphoric acid and then treating the calcium sulphate, while it still contains phosphoric acid, with ammonia and carbon dioxide so as to produce ammonium sulphate and calcium carbonate containing phosphate.

3. A process of making fertilizers which consists in causing sulphuric acid to react with calcium phosphate to form calcium sulphate and acid calcium phosphate and then treating the calcium sulphate, while it still contains acid calcium phosphate, with ammonium carbonate so as to produce ammonium sulphate and calcium carbonate containing phosphate.

4. A process of making fertilizers which consists in causing sulphuric acid to react with calcium phosphate to form calcium sulphate and acid calcium phosphate and then treating the calcium sulphate, while it still contains acid calcium phosphate, with ammonia and carbon dioxide so as to produce ammonium sulphate and calcium carbonate containing phosphate.

5. A process of making fertilizers by causing sulphuric acid to react with calcium sulphate to produce calcium sulphate and phosphoric acid, filtering the calcium sulphate and washing it until strong phosphoric acid ceases to be obtained, treating the calcium sulphate containing phosphoric acid and generally some calcium phosphate with ammonia and carbon dioxide and filtering the solid matter from the solution of ammonium sulphate thus obtained.

6. A process of making fertilizers by causing sulphuric acid to react with calcium phosphate to produce calcium sulphate and phosphoric acid, filtering the calcium sulphate and washing it until strong phosphoric acid ceases to be obtained, treating the calcium sulphate containing phosphoric acid and generally some calcium phosphate with ammonium carbonate and filtering the solid matter from the solution of ammonium sulphate thus obtained.

7. A process of making fertilizers which consists in causing sulphuric acid to react with calcium phosphate to form calcium sulphate and phosphoric acid, then treating the calcium sulphate, while it still contains phosphoric acid, with ammonium carbonate so as to produce ammonium sulphate and calcium carbonate containing phosphate, and mixing with an absorbent material the calcium carbonate containing phosphate thus produced.

8. A process of making fertilizers which consists in causing sulphuric acid to react with calcium phosphate to form calcium sulphate and phosphoric acid, then treating the calcium sulphate, while it still contains phosphoric acid, with ammonia and carbon dioxide so as to produce ammonium sulphate and calcium carbonate containing phosphate and mixing with an absorbent material the calcium carbonate containing phosphate thus produced.

9. A process of making fertilizers which consists in causing sulphuric acid to react with calcium phosphate to form calcium sulphate and acid calcium phosphate, then treating the calcium sulphate, while it still contains acid calcium phosphate, with ammonium carbonate so as to produce ammonium sulphate and calcium carbonate containing phosphate, and mixing with an absorbent material the calcium carbonate containing phosphate thus produced.

10. A process of making fertilizers which consists in causing sulphuric acid to react with calcium phosphate to form calcium sulphate and acid calcium phosphate, then treating the calcium sulphate, while it still contains acid calcium phosphate, with ammonia and carbon dioxide so as to produce ammonium sulphate and calcium carbonate containing phosphate and mixing with an absorbent material the calcium carbonate containing phosphate thus produced.

11. A process of making fertilizers by causing sulphuric acid to react with calcium phosphate to produce calcium sulphate and phosphoric acid, filtering the calcium sulphate and washing it until strong phosphoric acid ceases to be obtained, treating the calcium sulphate containing phosphoric acid and generally some calcium phosphate with ammonia and carbon dioxide, filtering the solid matter from the solution of ammonium sulphate thus obtained and mixing with an absorbent material the said solid matter.

12. A process of making fertilizers by causing sulphuric acid to react with calcium phosphate to produce calcium sulphate and phosphoric acid, filtering the calcium sulphate and washing it until strong phosphoric acid ceases to be obtained, treating the calcium sulphate containing phosphoric acid and generally some calcium phosphate with ammonium carbonate, filtering the solid matter from the solution of ammonium sulphate thus obtained and mixing with an absorbent material the said solid matter.

In testimony whereof we have signed our names to this specification.

EDWARD LLOYD PEASE. [L. S.]
DANIEL TYRER. [L. S.]